United States Patent [19]

Schüll et al.

[11] Patent Number: 5,476,902

[45] Date of Patent: Dec. 19, 1995

[54] PROCESSING AGENT HAVING A $C_8$-$C_{22}$ COMPONENT

[75] Inventors: Volker H. Schüll, Alzenau; Detlef Arnoldi, Weisenheim am Berg, both of Germany

[73] Assignee: Degussa Aktiengesellschaft, Frankfurt am Main, Germany

[21] Appl. No.: 420,902

[22] Filed: Apr. 11, 1995

Related U.S. Application Data

[63] Continuation of Ser. No. 123,106, Sep. 20, 1993, abandoned, which is a continuation of Ser. No. 78,078, Jun. 18, 1993, abandoned.

[30] Foreign Application Priority Data

Jun. 23, 1992 [DE] Germany ............... 42 20 453.4

[51] Int. Cl.⁶ .................. C08L 27/06; C08L 33/10
[52] U.S. Cl. .............. 525/227; 525/222; 525/231; 525/239; 526/328.5
[58] Field of Search ....................... 525/222, 227, 525/231, 239

[56] References Cited

U.S. PATENT DOCUMENTS

| | | |
|---|---|---|
| 2,868,763 | 1/1959 | Montgomery . |
| 3,705,137 | 12/1972 | Kuwahara et al. . |
| 4,216,046 | 8/1980 | Hackert ................... 156/252 |
| 4,408,015 | 10/1983 | Flatau ...................... 525/227 |
| 4,469,728 | 9/1984 | Belz ........................ 428/137 |
| 4,897,441 | 1/1990 | Siol ......................... 525/227 |

FOREIGN PATENT DOCUMENTS

| | | |
|---|---|---|
| 0058229 | 10/1981 | European Pat. Off. . |
| 2125989 | 9/1972 | France . |
| 2140152 | 2/1973 | Germany ................. 525/227 |
| 164209 | 12/1980 | Japan ..................... 525/227 |
| 971673 | 6/1963 | United Kingdom . |

OTHER PUBLICATIONS

Platzer, *Copolymers, Polyblends and Composites*, preface 18–19, 1975.
Patent Abstracts of Japan vol. 8, No. 241 (C-250) (1678) Nov. 6, 1984 Abstract in English corresponding to French pat. 2,125,989.
Chemical Abstracts vol. 114, 1991 p. 48 Columbus, Ohio US #44243h, Hosaka et al.
Polymer Journal Bd. 20, Nr. 8, 1988, Tokyo Jpan, pp. 693–698 entitled "Main Chain Flexibility and Side–Chain . . ." Gachter, Muller 'Handbuch der Kunststoff–Additive' 1979, Hanser, Muchen de Kapitel pp. 275–290 section 7.2 Search Report.

*Primary Examiner*—David Buttner
*Attorney, Agent, or Firm*—Cushman Darby & Cushman

[57] ABSTRACT

A processing agent for polyvinyl chloride and other thermoplastic polymers. The processing agent is a copolymer which contains a monomer whose homopolymer has a $T_g \geq 65$ C. and contains 3 to less than 75% by weight of a comonomer which has a $C_8$–$C_{22}$ alkyl component. The alkyl component should be apportioned in such a fashion that the transmission of the copolymer in ethyl acetate is at least 90% in the case of a 10% solution.

17 Claims, No Drawings

PROCESSING AGENT HAVING A C$_8$-C$_{22}$ COMPONENT

This is a continuation of application Ser. No. 08/123,106, filed on Sep. 20. 1993, which was abandoned upon the filing hereof which is a continuation of Ser. No. 08/078,078, filed Jun. 18, 1993, now abandoned.

The present invention relates to a thermoplastic polymer composition containing a processing agent. The invention also provides a method of producing the polymer composition and moldings produced from the polymer composition as well as certain polymers suitable as processing agents.

BACKGROUND OF THE INVENTION

Thermoplastic polymers such as e.g. polyvinyl chloride ("PVC") almost always contain processing agents, which impart improved physical properties to the thermoplastic. Depending on the composition of the thermoplastic, processing of the thermoplastic may not be possible without the processing agent. Thus, the processing agents bring about better working properties, the melting and flow behavior is improved, the polymer and optionally added additives such as stabilizers, external and internal lubricants, pigments, fillers, adhesion promotors, co-stabilizers, agents for increasing impact resistance, softeners, etc. can be homogenized better and more rapidly.

In particular, softener-free polyvinylchloride (PVC) is frequently processed to moldings such as e.g. plates, foils, pipes, foam parts and formed materials of many shapes. However, PVC in particular is difficult to process without processing agents since the thermoplastic tends to decompose before reaching the molten state. For this reason, processing agents have long been known and used which are intended to improve the processing and sliding properties in PVC and other thermoplastics. Thus, e.g., Published German Patent Application DE-OS 19 18 893 describes processing agents based on polyacrylate and suitable for various thermoplastics. In those agents, a copolymer of longer-chain and shorter-chain alkylacrylates imparts sliding properties to the processing agent. This involves a rubber-like polymer with unfavorable handling properties, the product tends during a concentration process, e.g. spray drying, to adhere and can therefore only be used as a solution.

The same problems are also presented by a processing agent for PVC polymers described in Published German Patent Application DE-OS 21 23 384. The agent described in that document essentially contains acrylic ester with C$_4$-C$_8$ alcohols and up to 9% by weight acrylonitrile. The processing agent described in that publication is prepared by means of the polymerization of monomers in fatty alcohols which are intended to impart to the thermoplastics at a later time the necessary sliding properties for processing on calender rollers.

A similar processing agent is disclosed in British Patent 981,116 which consists of a copolymer of methacrylates with short alcohol and acrylate units with somewhat longer alcohols. In PVC, only the short alcohols (C$_1$-C$_4$) are desired in the acrylate component. Otherwise, the processing agent becomes incompatible with the thermoplastic.

Short-chain processing agents based on polymethyl methacrylate ("PMMA") are known from British Patent 1,347, 287. These short-chain polyacrylates function as flow improvers. They are less suitable for PVC processing on calender rollers, since the thermoplastic bakes too rapidly on the calender rollers.

A further processing agent for PVC is described in U.S. Pat. No. 2,868,763 which is intended to be as compatible as possible with the PVC. To this end, a copolymer of primarily vinyl chloride and a lesser proportion of acrylates is produced, and in particular acrylic esters with a chain length of 6–10 carbon atoms in the alcohol are used. The thermoplastic PVC mixtures obtained can only be processed up to temperatures of slightly above 200° C. since the high proportion of PVC in the processing agent cannot impart sufficient thermostability to the thermoplastic mixture.

Because of the problems described above, multistage processing agents are described in the following patents and Published German Patent Applications: DE 16 94 409; DE 21 35 024 and DE 41 25 477; U.S. Pat. No. 4,436,861; Published European Patent Applications EP 0,061,134; EP 0,184,851 and EP 0,367,198. In the simplest instance, (DE 16 94 490, which represents an improvement over British Patent 981,116) a PVC suspension is taken as the starting point, onto which a mixture of alkylmethacrylates and alkylacrylates with differing length of the alkyl groups is polymerized. The processing agents produced in this manner require considerable amounts of an external lubricant which is intended to separate the melt of the thermoplastic to be processed from the walls of the processing machines used. If too little of the external lubricant is used, the melt can no longer be separated e.g. from calender rollers, even after a short time, and decomposition occurs on the roller. However, the external lubricants have the disadvantage that they exude on account of their incompatibility with the thermoplastic polymer and leave deposits on the walls of the processing machines.

Moreover, external lubricants considerably lengthen the gelling time of the thermoplastic, that is, the time between the start of mixing and the formation of a homogeneous melt of the thermoplastic is considerably lengthened.

In order to reduce the necessary amount of external lubricant, a multiphase acrylic compound polymer is suggested in Published German Patent Application DE 21 35 024 C2, U.S. Pat. No. 4,436,861 and in the European Patent Publications cited above, which primarily contains a soft acrylate phase with longer-chain alkyl groups adjacent to an encasing hard phase. According to the just-mentioned U.S. patent, the acrylic (co)polymer is even grafted onto the base polymer (PVC). The hard phase acts presumably as a processing agent, that is, it influences the viscosity and the gelling time as well as optionally also the sheen and other properties of the thermoplastic polymer; on the other hand, the soft phase has presumably the effect of an external lubricant. It has the advantage that this "lubricant" can be compatible, depending on the composition of the processing agent, with the thermoplastic polymer, so that during the processing of the melt the exuding and the associated formation of a coating are reduced. The soft core is isolated to the outside by the hard polymer shell so that the multi-shell processing agents no longer tend to adhere and can be correspondingly spray-dried. These processing agents can therefore be worked more readily into the thermoplastic polymers. A disadvantage of the multi-shell polymers is the fact that in order to obtain an acceptable lubricating action while retaining the properties of the processing agent, the method of production and the composition must often be coordinated very precisely down to the smallest details such as e.g. the chain transfer agents, so that even rather small variants in the composition or the method result in a product with low-grade properties. Basically, a compromise between the dissolving properties of the machine walls and the gelling time is necessary, as also in the general use of external lubricants, since the gelling time is noticeably lengthened in asssociation with the better lubricating action. In the extreme instance, the gelling can even be eliminated.

SUMMARY OF THE INVENTION

The object of the present invention is to develop a thermoplastic polymer composition whose processing agents exhibit good external lubricating action with short gelling times. In addition, the blend, as well as the processing agents, should be simple to produce and handle and thus be economical.

In accordance with the present invention, these and other objects are achieved by a thermoplastic shaped article containing a thermoplastic polymer and a copolymer which is different from the thermoplastic polymer. In this shaped article, the copolymer contains, as base units, a monomer which has a $T_g$ of $\geq 65°$ C., as homopolymer and contains at least 3, and at most less than 75%, by weight of a comonomer which has a $C_8$–$C_{22}$ alkyl component. This portion of the alkyl component brings about a light transmission of at most 90% (560 nm, 1 cm) by a 10% (wt./wt.) solution of the copolymer in ethyl acetate.

The novel thermoplastic shaped articles contain, in addition to a thermoplastic polymer, a copolymer which contains a monomer as base unit, a homopolymer of said monomer having a glass transition temperature ($T_g$) $\geq 65$ C. The copolymer contains at least 3% by weight to less than 75% by weight, preferably a max. of 70% by weight of a comonomer which comprises a $C_{8-C22}$ alkyl component. The term "homopolymer" denotes, in this connection, a homopolymer which has a molecular weight which is so high that substantially no change of the $T_g$ results upon a further increasing of the molecular weight. In the case of methylmethacrylate as monomer, this is achieved with a polymer having a molecular weight ($M_w$) of approximately 100,000.

The comonomer is customarily present in an amount of less than 60% in the copolymer, and 10 to 40% by weight is especially preferred. Those copolymers are excluded which contain vinyl chloride as monomer and acrylic acid —$C_8$–$C_{16}$ esters as comonomer to the extent that they are used in PVC.

The comonomer is preferably selected from the group consisting of (meth)acrylic acid —$C_8$–$C_{22}$ esters, vinyl —$C_8$–$C_{22}$ ethers, vinyl —$C_8$–$C_{22}$ esters, $C_8$–$C_{22}$ alkylamido(meth)acrylates. The methacrylic acid esters are especially preferred in this connection, since they have the best compatibility with thermoplastic polymers such as e.g. PVC or the like. Moreover, those esters or ethers which have at least 8 carbon atoms in a chain are especially preferred. The best results were obtained with alkyl components between 10 and 16 carbon atoms and especially with 12–14 carbon atoms, with linear chains being preferred again.

The homopolymer of the monomer forming the base units in the copolymer preferably has a $T_g \geq 80°$ C. It is furthermore advantageous if the entire copolymer has a $T_g \geq 40°$ C., especially $\geq 50°$ C. A good effect of the copolymer as processing agent is achieved by the high $T_g$ of the homopolymer of the monomer and the indicated glass temperatures of the copolymer support this. They also influence the production process in an advantageous manner, as well as the handling and the working in of the copolymer into the shaped article.

The indicated $T_g$ values also make it possible for the copolymers of the invention to be capable of isolation by means of spray-drying of the corresponding polymer dispersions.

The monomer, which has a glass transition temperature $\geq 65°$ C. as a homopolymer, is selected with advantage from the group consisting of methylmethacrylate, (meth)acrylonitrile, styrene, α-methylstyrene, (meth)acrylamide, vinyltoluene with methylmethacrylate being especially preferred since it is relatively economical and has the best compatibility with the thermoplastic polymer such as e.g. PVC or the like.

The copolymer advantageously has a molecular weight $M_w \geq 100,000$, preferably $\geq 300,000$ and is preferably a thermoplastic.

The molecular weight can be determined in a known manner, e.g. with size exclusion chromatography (SEC). The molecular weights were determined with an apparatus from Spectra Physics. Column combination: PL-EL M; 1 =30 cm, internal diameter=7.5 mm; flow: 1.22 cm³ THF/min.; pressure 2900 psi; weighed portion: 38 mg substance in 15 cm³ THF. The molecular weight was determined by means of 19 polystyrene calibration standards and correction factors for the composition of the polymer of the invention. Molecular weight range from $M_w$=162 to $M_w$=7,000,000.

The copolymers used in accordance with the invention are random copolymers which contain long alkyl side chains statistically distributed according to the polymerization process in a backbone with short side chains. The long alkyl side chains are preferably formed by monomers such as decylmethacrylate, laurylmethacrylate, stearylmethacrylate and corresponding mixtures (e.g. methacrylic acid —$C_{10}$–$C_{14}$ esters). The copolymerization is carried out in a known manner, e.g. by means of suspension polymerization, emulsion polymerization or bulk polymerization. Emulsion polymerization and subsequent spray drying are preferred.

Similar copolymers are already known as, among other things, lubricating oil additives (preferably with very long alkyl side chains) and also as textile lubricants (see, Published German Patent Application DE 39 39 549 A1) (preferably with rather short alkyl side chains). Thus, U.S. Pat. No. 5,112,509 describes lubricating oil additives based on laurylmethacrylate/methylmethacrylate. The laurylmethacrylate proportion is selected to be so high that the copolymer obtained has a $T_g$ far below 0° C. With approximately 80 to 90% by weight laurylmethacrylate in the copolymer, the latter provides good external lubrication action but no further properties as a processing agent. Similarly, U.S. Pat. No. 4,756,843 describes an oil additive which is not intended for use in polymer mixtures. The described copolymer has a very low glass temperature on account of its composition with very high longer-chain alkylmethacrylate proportion. This product too can only be used as a lubricant and not as a further processing agent.

The copolymers of the invention can be processed with advantage with thermoplastic polymers which are built up differently than the copolymer, in which instances the copolymer exhibits excellent properties as an external lubricating and processing agent. Preferred thermoplastics are polyvinyl chloride, polyvinylidene chloride, post-halogenated polymers and copolymers, containing primarily vinyl chloride or vinylidene chloride, e.g. copolymers with vinyl acetate. Other polymers are e.g. polycarbonate, polyvinylacetate, polyalkenes, polylactams or a copolymer based on one of these polymers. It proved to be especially advantageous and surprising, in this connection concerning the polymers of the invention, that, in comparison to the similar, known (above-described) copolymer additives, which exhibit e.g. in PVC an external lubricating action, a totally differently acting copolymer can be obtained solely by means of slight changes or by a selection of certain monomers or by the selection of certain properties in the copolymer which can be readily adjusted by a person skilled in the art. Such a totally differently acting copolymer exhibits, in addition to its advantageous properties of use (simple production and smooth formulation and metering), totally novel and surprising actions when used in other polymers. Thus, the known core-shell PVC additives produced with longer-chain monomers do exhibit a good external lubricating action but resulted in a lengthening of the gelling time (cf. also Example 4). In the past, it was only possible to compensate for this adverse effect by the addition of other processing agents or by the using of multi-shell processing agents. A multi-shell processing agent is a combination of different (co)polymers with a (co)polymer which exhibits an external lubricating action and with another (co)polymer which is customarily in the shell and shortens the gelling time.

In contrast thereto, the product of the invention is advantageously one single copolymer which exhibits, e.g. in PVC, on the one hand an action as an external lubricant and (!) results at the same time in a shorting of the gelling time. The copolymer of the invention exceeds all known products which are suitable for compensating to a greater or lesser degree for the opposing effects described above by means of a combination of different polymers and/or copolymers, whether separately or in the form of multi-shell copolymers.

Usually, 0.1–20 parts by weight of the copolymer are incorporated per 100 parts by weight of thermoplastic polymer; 0.8 and up to 5 parts by weight copolymer are preferred.

The copolymer is preferably a thermoplastic and is usually not present as a block or a graft polymer. The typical structure of the copolymer is comb-like. The copolymer is preferably single-shelled, that is produced in a one-stage method, that is, without additional polymer shells or polymer nuclei. However, if need be, the copolymer can also be grafted with or onto other polymers.

Those homogeneous copolymers are preferred which contain the individual monomers in statistical distribution. The copolymers are basically used preferably without polymer shells. These copolymers are simple and thus economical to produce, can be readily processed with a thermoplastic polymer and exhibit excellent results. Additional processing agents and lubricants can be reduced or are entirely superfluous. It was only possible to achieve such properties in the past with processing agents produced in a multi-stage manner, especially with multiphase acrylic compound polymers such as those described in Published German Patent Application DE 21 35 024 C2. The copolymers of the invention even surpass such core shell products in their effectiveness.

Shaped articles can be produced with advantage from the thermoplastic compositions; in particular, foils or objects which are present in a composite with such a foil are preferred.

The invention also includes a novel type of copolymer which contains, as base units, a (meth)acrylic acid ester and which also contains a further monomer. (Meth)acrylic acid ester is present in the copolymer to a degree of at least 3% by weight, and contains, as methacrylic acid ester, a $C_8$–$C_{22}$-, preferably a $C_{10}$–$C_{16}$-alcohol component and as acrylic acid ester a $C_{11}$–$C_{22}$-, preferably a $C_{11}$–$C_{16}$-alcohol component. The further monomer has as homopolymerizate a $T_g \geq 65°$ C. and the copolymer of the invention a $T_g \geq 40°$ C. The copolymer is homogeneously present, that is, it is not grafted and has no graftings and can be obtained by means of a conventional polymerization of the corresponding monomers. Pure copolymers consisting of $\geq 75\%$ vinylidene chloride, <25% vinyl chloride and/or <10% methylacrylate, methylmethacrylate, laurylmethacrylate according to Published Japanese Patent Application JP-A 53/104,395 are excluded.

The copolymer preferably has a $T_g \geq 50°$ C. and is used in particular as a lubricating and processing agent for thermoplastic polymers. As regards its further details, this homogeneous copolymer corresponds to the above-described copolymer used in the thermoplastic composition.

The invention also provides a method for processing a thermoplastic polymer in which a thermoplastic polymer is intimately mixed with a lubricating and processing agent to a thermoplastic form mass and the latter is placed into a mold. A homogeneous copolymer with a molecular weight of $M_w \geq 100,000$ is used as lubricating and processing agent, which copolymer contains as base units a monomer which exhibits a $T_g \geq 65$ C as homopolymer and which copolymer contains at least 3% by weight of a methacrylic acid ester which has a $C_8$–$C_{22}$-alcohol component, and/or contains an acrylic acid ester with a $C_{11}$–$C_{22}$-alcohol component. The mixing preferably takes place at an elevated temperature and with melting of the polymer. It takes place in particular on a roller mill or in an extruder.

The copolymers of the invention generally have such a high proportion of longer alkyl groups that the solubility of the copolymer in ethyl acetate is adversely affected. Known copolymers (see e.g. British Patent 981,116) which are used in particular as processing agents can usually be mixed as desired with ethyl acetate. The copolymers of the invention, on the other hand, cause a turbidity on account of their higher non-polar alkyl portion. Tables 1 and 2 show this turbidity behavior upon increasing chain length and upon increasing portion of the long-chain comonomer, measured with the universal measuring unit UME 3 (firm Dr. Lange); cell transparency measuring head LT 12, filter VG 9 grey, wavelength 560 nm (green side filter), free path of the cell 10 mm.

TABLE 1

| Copolymer (10% by Weight) In Ethyl Acetate | Viscosity Number (cm³/g) | Transmission (%) |
| --- | --- | --- |
| MMA/n-BMA (20 parts n-BMA) | 350 | 96 |
| MMA/n-LMA (20 parts n-LMA) | 303 | 31 |
| MMA/n-SMA (20 parts n-SMA) | 192 | 1 |

BMA = butyl methacrylate
LMA = lauryl methacrylate
SMA = stearyl methacrylate
MMA = methyl methacrylate

TABLE 2

| Copolymer (10% (wt./wt.) in ethyl acetate. | viscosity number (cm³/g) | Transmission (%) |
| --- | --- | --- |
| MMA/LMA (3 parts LMA) | 244 | 76 |
| MMA/LMA (5 parts LMA) | 238 | 65 |
| MMA/LMA (10 parts LMA) | 208 | 49 |
| MMA/LMA (20 parts LMA) | 303 | 31 |
| MMA/LMA (30 parts LMA) | 199 | 23 |

MMA = methyl metacrylate
LMA = lauryl methacrylate

It is apparent from the values of the transmission that the solutions become more turbid as the length of the side chain of n-butyl, n-lauryl to n-stearyl increases. The same applies to an increasing concentration of long-chain comonomer. It is remarkable that even 3 parts lauryl methacrylate in the copolymer result in a distinct turbidity whereas, on the other hand, a copolymer with 20 parts butyl methacrylate goes right into solution. This is brought about by the principle of "like dissolves like"-the polar solvent ethyl acetate dissolves polar polymers better than non-polar ones. As the length of the side chain and after a certain length of the side chain with increasing proportion of the comonomer in the copolymer, the copolymers become more non-polar and harder to dissolve and result in turbid solutions. The decrease of the polarity of the copolymers along with, at the same time, a content of the monomer which is defined above, functions as base unit and is preferably polar, appears to be responsible for the action of the polymers of the invention, namely their ability to be used as processing agents with an additional action as external lubricant. The copolymer of the invention can therefore be additionally characterized with a transmission of at the most 90% in a 10% (wt./wt.) solution in ethyl acetate. Values below 85% and especially those below 80% are preferred. Especially suitable copolymers have a transmission between 50% and 10% and values between 20% and 40% were determined for the best copolymers.

The decreasing transmission is accompanied by the solubility and turbidity concentration of the copolymers of the invention in ethyl acetate. Table 3 shows the turbidity concentration for a few copolymers.

TABLE 3

| Copolymer | Viscosity number (cm³/g) | Turbidity Concentration (g copolymer/100 g ethyl acetate) | Comments |
|---|---|---|---|
| MMA/BMA (20 parts BMA) | 319 | >4.5 | clear solution |
| MMA/LMA (10 parts LMA) | 208 | >5.75 | slightly turbid |
| MMA/LMA (20 parts LMA) | 303 | 2.0 | turbid |
| MMA/LMA (30 parts LMA) | 199 | 2.0 | turbid |
| MMA/SMA (20 parts SMA) | 192 | 0.5 | turbid |

MMA = methyl methacrylate
LMA = lauryl methacrylate
SMA = stearyl methacrylate

As in tables 1 and 2, the turbidity concentration of the copolymer drops with increasing length of the alkyl chain and with a higher content of the long-chain alkyl component in the copolymer. The copolymers of the invention exhibit turbidity at 10% (wt./wt.) solution, preferred copolymers exhibit turbidities in the case of solutions under 6%, especially under 3%. Copolymers with a turbidity concentration of approximately 2 g copolymer/100 g ethyl acetate are especially preferred.

DETAILED DESCRIPTION OF PREFERRED EMBODIMENTS

The invention will be illustrated in detail in the following examples. Determination of the glass transition temperature ($T_g$)

$T_g$ is the abbreviation for "glass transition temperature", frequently also designated as glass temperature. The glass transition temperature is a temperature range of 5°–20° C. in which a polymer melt which is gradually cooling off from a higher temperature solidifies like glass. The glassy state is, in the most general sense, the solid state of macromolecular compounds into which the latter turn when cooling off from the melt (rubber-elastic state).

Note: From: Grundriss der makromotekularen Chemie Vol. IV, Macromolecular Aggregate States, Bruno Vollmert, page 147

The method used for measuring the glass conversion temperature is the differential thermoanalysis (DTA).

The measuring principle of the DTA is as follows:
(From: Werkstoffkunde der Kunststoffe; Georg Menges; Carl Hanser Verlag Munich-Vienna)

The specimen P and an inert substance V are placed in a linearly heatable oven. Both are provided with a thermoelement. The thermoprobes are connected opposite to one another so that no thermovoltage appears as long as P and V exhibit the same temperature:

$$\Delta_T = T(P) - T(V) = 0.$$

On the other hand, if a transition occurs in the specimen, e.g. at the temperature Tu, heat is consumed or released and $\Delta_T \neq 0$.

A thermovoltage now appears which is recorded and makes possible statements about the reaction temperature Tu, reaction heat $\Delta_H$, the course of the reaction and the glass conversion temperature.

Amorphous polymers exhibit a jump in their specific heat at glass conversion point $T_g$ which jump can be demonstrated with the aid of DTA. Such a substance exhibits only one shift of the zero line in the DTA diagram and the height of the shift is proportional to the jump of the specific heat. The glass point $T_g$ is determined by the turning point in the curve. The DTA measurements are carried out with a DTA device of the Mettler company, type: measuring cell DSC 30.

EXAMPLE 1

Production of an LMA/MMA copolymer 108.8 g sodium peroxodisulfate are added to 66.0 kg demineralized water at a temperature of 89° C. An emulsion of 61.0 kg demineralized water, 5.9 kg diisooctylsulfosuccinate (75% solution), 102.9 kg methylmethacrylate, 44.1 kg laurylmethacrylate and 27.2 g sodium peroxodisulfate is added with agitation. The monomer mixture reacts in the reactor with agitation and charging of the emulsion in 2 hours. An atmosphere of inert gas is necessary during the experiment. The polymerized dispersion is spray-dried by means of a rotating-disk atomizer and drying temperatures of 70°–160° C. A fine powder which flows well is obtained.

Copolymers of MMA and LMA can be polymerized in the same manner whose content of laurylmethacrylate varies from 3–75% by weight as well as copolymers of methylmethacrylate and other monomers such as stearylmethacrylate, decylmethacrylate, stearylacrylate, laurylacrylate, ethylhexylmethacrylate. The isolation of the dispersion's solid can be done by spray-drying or coagulation.

EXAMPLE 2

2500.0 g Vinnol H 65 D (PVC powder $M_w$ >74,000), 150.0 g Omyalite 95 T (chalk), 100.0 g titanium dioxide Kronos Cl 220 and 125.0 g stabilizer mixture Baropan E 16435 FP are processed in a fluid mixer or blade mixer heating-cooling mixer) to a PVC dry blend. The individual raw materials are placed into the mixer and the mixture allowed to heat up at high speed of the agitating unit to 120°

C. bulk temperature. The mixture is cooled down to below 40° C. at a low speed and the mixer is then emptied. 100 parts by weight of the test recipe produced in this manner were mixed with 4 parts of the copolymer of the invention by means of powder-mixing on a roller mill. This mixture serves as a base for later examples and is suitable e.g. for PVC profiles.

EXAMPLE 3

1,000.0 g Vinnol H 60 D (PVC powder $M_w$ 62,000), 30.0 g Okstan OM 100 (stabilizer mixture), 5.0 g Barolub L-PL lubricant are converted together with the copolymers described in later examples in a heating-cooling mixer (see Example 2) into PVC dry blends.

These mixtures are suitable e.g. for PVC foils.

Measuring kneader experiments (Plasticorder type PL 2000 and type PLE 330) and roller mill experiments (Collin roller) are carried out with the PVC dry blends produced in accordance with Examples 2 and 3.

Measuring kneader experiments

The powder mixtures produced according to Example 2 are gelled in a measuring kneader (company Brabender, type PLE 330) at a housing temperature of 170° C. and a speed of the kneading blades of 50 rpms. The powder mixtures produced according to Example 3 are gelled in a measuring kneader (company Brabender, type PL 2000) at a housing temperature of 130° C. and a speed of 50 rpms. Gelling signifies that the powder mixture is converted under the influence of shearing and heat from a powdery consistency into a compact and solid material.

Important parameters during the gelling of PVC dry blends in measuring kneaders are the gelling time and the equilibrium torque at a given temperature. During the gelling of the PVC dry blend, which contains a PVC processing agent, the torque is registered as a function of the time at given temperatures and speeds. The time from the start of measuring to the maximum torque is the gelling time. The torque after 10 minutes measuring time is the equilibrium torque and is a measure for the viscosity of the PVC melt in the measuring kneader.

Experiments with the roller mill

Experiments with the roller mill (Collin roller) are carried out in order to characterize the lubricating properties of the product. PVC powders according to Example 3 were placed on a roller mill, milled and thereby gelled. The rollers of the roller mill have a temperature of 200° C. and a speed of 30 rpms. A specimen is taken every 5 minutes. A test is made to see how long the particular recipe can be rolled on the roller until it adheres to the hot roller surface. The longer it takes until the PVC melt bakes onto the roller, the better the lubricating action.

The results are given in Table 4.

EXAMPLE 4 (REFERENCE)

Comparison of the effects of a PVC processing agent with lubricating action and of a PVC processing agent without lubricating action 2 phr (corresponding to 2 parts PVC processing agent per 100 parts PVC powder) of a PVC processing agent with lubricating action—a two-stage emulsion polymer—(Paraloid K 175 from Rohm & Haas according to Published German Patent Application DE 21 35 024 C2) and 2 phr of a PVC processing agent without lubricating action—a one-stage emulsion polymer—(Paraloid K 120N) were worked into a blend according to Example 3 and processed on a roller mill. The PVC recipe with PVC processing agent with lubricating action remains for 28 minutes on the roller mill until the melt starts to bake on. In the case of the PVC processing agent without lubricating action the PVC melt bakes onto the roller surfaces after 10 minutes. This shows that PVC-VH with lubricating action reduces, in comparison to PVC-VH without lubricating action, the tendency of the PVC melt to bake onto hot metallic surfaces of processing machines.

However, lubricants in PVC recipes can lengthen the gelling time of the PVC and lower the viscosity even in concentrations of 0.3% by weight to 2.0% by weight (see "Plastifizierzeitmessungen an Hart-PVC-Pulvermischungen mit einem Brabender Plastographen", reprint from "Kunststoffe und Gummi", page 4, issue 4, 1965, here: Montan(in) wax). The processing agent with lubricating action exhibits, in comparison to the processing agent without lubrication action, a lengthening of gelling time which is considerable but still acceptable.

EXAMPLE 5

2 phr of a copolymer MMA/LMA (80 : 20) are worked into the formulation of Example 3 in accordance with the method described there. The copolymer has a viscosity number of 297 $cm^3/g$. The viscosity number ("VZ") is determined according to DIN 51562. The VZ is a measure of the molecular weight of polymers. The greater the VZ, the greater the molecular weight.

The product has a rolling time of 29 minutes and a gelling time of 10 seconds. The copolymer develops a lubricating action like the two-shell PVC processing agent with lubricating action cited in Example 4, but without lengthening of the gelling time.

EXAMPLE 6

Since the molecular weight exerts a great influence on the properties of polymers and copolymers, a copolymer with a VZ different from the one in Example 5 was tested.

2 ph of a copolymer from MMA/LMA (80:20) are worked into the formulation of Example 3 according to the method described there. The copolymer has a viscosity number of 226 $cm^3/g$.

The product was tested with the rolling test and remained on the roller for 27 minutes without baking onto it. This shows that even the copolymer with the composition MMA/LMA (80:20) with a lower viscosity number, that is, with low molecular weight, develops the same lubricating action as the copolymer of Example 5. The testing of the powder mixture in a measuring kneader shows that the gelling time of this powder mixture is 8 seconds. The gelling time of the powder mixture from Example 6 is thus even shorter than the gelling time of the powder mixture of Example 5.

TABLE 4

| Example (No) | Type | Amount Used (Parts by Weight, phr) | Rolling Test (minutes) | Coating (plate out) | Gelling Time (seconds) | Transparency (visual) |
|---|---|---|---|---|---|---|
| 4 | 2-stage E-polymer K 175 | 2 | 28 | heavy | 118 | good |
|  | 1-stage E-polymer K 120 N | 2 | 10 | heavy | 10 | good |
| 5 | MMA/LMA Copolymer | 2 | 29 | without | 10 | good |
| 6 | MMA/LMA Copolymer | 2 | 27 | without | 8 | good |
| 7 | 2-stage E-copolymer | 3 | 28 | heavy | 128 | good |
| 8 | MMA/LMA copolymer | 3 | 26 | without | 14 | good |
| 9 | MMA/SMA copolymer | 2 | 25 | weak | 104 | turbid |

Examples 5 and 6 show that the copolymers of the invention exhibit a lubricating action as well as do commercial, multistage PVC processing agents with lubricating action already. In addition, the copolymers of the invention exhibit, in a novel and surprising manner, a distinctly shorter gelling time than the two-stage emulsion polymers and thus do not exhibit the undesired lengthening of gelling time of conventional lubricants.

EXAMPLE 7 (REFERENCE)

Example 4 was repeated with the difference that 3 parts by weight of the two-stage emulsion polymer were worked into the formulation according to Example 3.

EXAMPLE 8

Example 5 was repeated with the difference that 3 parts by weight of the copolymer of methylmethacrylate and laurylmethacrylate were worked into the formulation according to Example 3.

The results are shown in Table 4. The MMA/LMA copolymer exhibits, as in the case of the two-stage emulsion polymer, a lubricating action. In the roller test it took 26 or 28 minutes until the PVC melt baked onto the roller. However, the methylmethacrylate/laurylmethacrylate copolymer brings about a distinctly more rapid gelling of the recipe.

EXAMPLE 9

Example 5 was repeated with the difference that two parts by weight of a copolymer of methylmethacrylate and stearylmethacrylate (ratio methylmethacrylate to stearylmethacrylate=80:20 parts by weight) were worked into the formulation. The viscosity number of the copolymer is 192 cm$^3$/g.

EXAMPLE 10 (REFERENCE)

A copolymer of methylmethacrylate and hexylmethacrylate in an amount of 4 parts by weight was worked into the formulation of Example 2 according to the method described in it. The ratio of methylmethacrylate to hexylmethacrylate is 80:20. The viscosity number, as a measure of the molecular weight of the copolymer, is 484 cm$^3$/g.

EXAMPLE 11

A copolymer of methylmethacrylate and decylmethacrylate in an amount of 4 parts by weight was worked into the formulation of Example 2 according to the method described in it. The ratio of methylmethacrylate to decylmethacrylate was 80:20. The viscosity number as a measure of the molecular weight of the copolymer was 310 cm$^3$/g.

EXAMPLE 12

The copolymer of Example 6 in an amount of 4 parts by weight was worked into the formulation of Example 2 according to the method described in it. The ratio of methylmethacrylate to laurylmethacrylate is 80 : 20. The viscosity number of the copolymer is 226 cm$^3$/g.

EXAMPLE 13

The copolymer of Example 9 in an amount of 4 parts by weight was worked into the formulation of Example 2 according to the method described in it. The ratio of methylmethacrylate to stearylmethacrylate is 80:20. The viscosity number is 192 cm$^3$/g.

The gelling times of the test formulations with the copolymers from Examples 10 to 13 are given in Table 5. It can be seen that the methylmethacrylate/laurylmethacrylate copolymer has the shortest gelling time of all of the copolymers measured.

TABLE 5

Influence of Comonomer on the Gelling Time in Measuring Kneader Experiments

| Example (No.) | Copolymer of 80 Parts MMA and 20 Parts of | Viscosity Number (cm$^3$/g) | Gelling Time (minutes) |
|---|---|---|---|
| 10 | hexyl methacrylate | 484 | 3.7 |
| 11 | decyl methacrylate | 310 | 3.1 |
| 12 | lauryl methacrylate | 226 | 1.8 |
| 13 | stearyl methacrylate | 192 | 3.3 |

EXAMPLE 14 (REFERENCE)

4 parts by weight of a copolymer of methylmethacrylate and hexylmethacrylate were worked into the formulation of Example 2 according to the method described in it. The ratio of methylmethacrylate to hexylmethacrylate is 80:20. The viscosity number is 650 cm$^3$/g.

EXAMPLE 15

4 parts by weight of a copolymer of 80 parts MMA and 20 parts laurylmethacrylate were worked into the formulation of Example 2 according to the method described in it. The viscosity number of the copolymer is 297 cm$^3$/g.

EXAMPLE 16

4 parts by weight of a copolymer of 80 parts methylmethacrylate and 20 parts stearylmethacrylate were worked into the formulation of Example 2 according to the method described in it. The viscosity number of the copolymer is 296 cm$^3$/g.

TABLE 6

Influence of the Viscosity Number

| Example (No) | Copolymer of 80 parts MMA and 20 parts of | Viscosity Number ($cm^3/g$) | Gelling Time (minutes) |
| --- | --- | --- | --- |
| 14 | hexyl methacrylate | 650 | 5.8 |
| 15 | lauryl methacrylate | 297 | 2.4 |
| 16 | stearyl methacrylate | 296 | 4.5 |

In table 6 the copolymer of methylmethacrylate and laurylmethacrylate again has the shortest gelling time. A comparison with Table 5 shows that in the case of copolymers with a higher molecular weight (higher viscosity number) the gelling time is longer than that of the low-molecular weight copolymer.

EXAMPLE 17

A copolymer of 90 parts methylmethacrylate and 10 parts laurylmethacrylate in an amount of 4 parts by weight was worked into the formulation of Example 2 according to the method described in it. The viscosity number is 208 $cm^3/g$.

EXAMPLE 18

A copolymer of 10 parts laurylmethacrylate and 90 parts methylmethacrylate in an amount of 4 parts by weight was worked into the formulation of Example 2 according to the method described in it. The viscosity number of this copolymer was 322 $cm^3/g$.

TABLE 7

Influence of the Amount of Comonomer on the Gelling Time of Copolymers In Test Formulations

| Example (No.) | Copolymer MMA (Parts by Weight) | Copolymer LMA (Parts by Weight) | Viscosity Number ($cm^3/g$) | Gelling Time (minutes) |
| --- | --- | --- | --- | --- |
| 17 | 90 | 10 | 208 | 3 |
| 12 | 80 | 20 | 226 | 1.8 |
| 18 | 90 | 10 | 322 | 3.6 |
| 15 | 80 | 20 | 297 | 2.4 |

It can be seen that increasing the amount of laurylmethacrylate in the copolymer shortens the gelling time.

The examples in Table 7 show that even higher-molecular copolymers of methylmethacrylate and laurylmethacrylate bring about shorter gelling times of the PVC test formulation. A comparison of Example 17 and Example 18 shows that, in copolymers of the same comonomer composition but with different molecular weight, the higher-molecular weight products have the longer gelling times.

The copolymers of the invention offer shorter production times over the processing agents with lubricating action which are produced via two-stage emulsion polymerization. In two-stage emulsion polymerization, the first stage, the so-called core, is polymerized. Then, in a second polymerization stage, the so-called shell is polymerized onto the core. If an intermediary reaction time between the first and the second stage is also taken into consideration, a distinctly longer total polymerization time necessarily results in the production of the two-stage emulsion polymer.

The copolymers of the invention, especially those based on methylmethacrylate/laurylmethacrylate, exhibit no or only a slight coating formation on the rollers. The two-stage emulsion polymers result in a strong coating formation. Coating formation on calender rollers, in nozzles and on tools of plastic processing machines is an extremely undesired effect which can lead to a decrease in the quality of the product and to an interruption of the manufacturing process of plastic products.

In the manufacture of PVC foils the copolymers of the invention result in foils with significantly fewer filler specks and significantly better transparency than those processing agents with lubricating action which are produced via two-stage emulsion polymerization.

The copolymers of the invention make it possible to use a low quantity of external lubricants in the PVC formulation, which reduces plate out.

The copolymers of the invention can be used as the sole processing agents with lubricating action in PVC recipes, whereas the processing agents with lubricating action, which are two-stage emulsion polymers, are almost always used together with conventional processing agents. The latter fact is known to persons skilled in the art when preparing PVC formulations for many applications. Formulations with fewer components offer advantages when weighing and mixing, in the manufacture of PVC dry blends.

What is claimed is:

1. A thermoplastic composition comprising a thermoplastic poly vinyl chloride polymer and a copolymer which is different from the thermoplastic polymer, said copolymer containing, as base units, a monomer whose homopolymer has a $T_g > 65°$ C., the molecular weight of said homopolymer being so high that there is substantially no change in $T_g$ upon further increasing the molecular weight, and said copolymer containing at least 3 to less than 75% by weight of a comonomer which has a $C_{10}$–$C_{22}$ alkyl component, the amount of the alkyl component being selected so that a 10% (wt./wt.) solution of the copolymer in ethyl acetate has a light transmission of at most 90% (560 nm, 1 cm), and said copolymer is obtained from an emulsion polymerization process.

2. A thermoplastic composition according to claim 1 in which the comonomer is selected from the group consisting of (meth)acrylic acid-$C_{10}$–$C_{22}$-esters, vinyl-$C_{10}$–$C_{22}$-ethers and vinyl $C_{10}$–$C_{22}$-esters.

3. A thermoplastic composition according to claim 1 or claim 2 in which a homopolymer of the monomer has a $T_g \geq 80°$ C.

4. A thermoplastic composition according to claim 1 or claim 2 in which the copolymer has a $T_g \geq 50°$ C.

5. A thermoplastic composition according to claim 1 or claim 2 in which the monomer, whose homopolymer has a $T_g \geq 65°$ C., is selected from the group of methylmethacrylate, (meth)acrylonitrile, styrene, α-methylstyrene and vinyl toluene.

6. A thermoplastic composition according to claim 1 or claim 2 in which the alkyl component contains 10–16 carbon atoms.

7. A thermoplastic composition according to claim 6 in which said alkyl component contains 12–14 carbon atoms.

8. A thermoplastic composition as set forth in claim 6 in which said alkyl component is linear.

9. A thermoplastic composition according to claim 1 or claim 2 in which the copolymer has a molecular weight $M_w \geq 100,000$.

10. A thermoplastic composition according to claim 9 in which the copolymer has a molecular weight $M_w \geqq 300,000$.

11. A thermoplastic composition according to claim 1 or claim 2 which contains up to 20 parts by weight of the copolymer per 100 parts by weight of thermoplastic polymer.

12. A thermoplastic composition according to claim 11 which contains up to 5 parts by weight of the copolymer per 100 parts by weight of thermoplastic polymer.

13. A thermplastic composition as set forth in claim 1 or claim 2 in which the copolymer in the thermoplastic polymer acts as a lubricating and processing agent.

14. A thermoplastic composition as set forth in claim 1 or claim 2 in which the copolymer is a thermoplastic.

15. A thermpoplastic composition as set forth in claim 1 or claim 2 in which the copolymer has a solubility in ethyl acetate of less than 3 g/100 g.

16. A shaped article comprising the thermoplastic composition of claim 1 or claim 2.

17. A foil comprising the thermoplastic composition of claim 1 or claim 2.

* * * * *